United States Patent Office 2,817,195
Patented Dec. 24, 1957

2,817,195
CLEANING METAL SURFACES

Leo P. Curtin, Cranbury, N. J.

No Drawing. Application January 24, 1956
Serial No. 561,132

2 Claims. (Cl. 51—282)

This invention relates to processes for cleaning metal surfaces and it comprises treating the metal surface with a solution containing dissolved cleaning agents, preferably with various additives calculated to promote the soil-removing action of the solution, said solution being made into a slurry with sand or other abrasive material, said slurry then being sprayed against said metal surface until oil and dirt are removed; all as is more fully hereinafter set forth and as claimed.

The surface-active and cleaning agents which have been found useful in my process include silicates of soda, preferably the ortho-, sesqui- and meta-compounds, trisodium phosphate, free caustic alkali or a source thereof, borates of soda, ammonium hydroxide and basic amines, soap, non-ionic and anionic synthetic detergents and the like, including various mixtures of such materials.

A non-ionic detergent which is effective is a mixture of oleic and linoleic acids solubilized by replacing the carboxylic hydrogen by eight to eighteen, more or less, oxy-ethylene groups.

In the anionic group of synthetic detergents, the alkali-metal salts of the following have been found particularly useful: lauryl sulfuric acid, condensation products of fatty acids, as oleic, with N-methyl taurine, and dodecyl benzene sulfonic acid. Considering all factors, including cost, the last-named is one of the most useful of the synthetic detergents and surface-active agents for the present process.

Other useful additives include such materials as chelating agents, as ethylene diamine tetraacetic acid sodium salt, and sequestering agents, such as the sodium polyphosphates and carboxymethyl cellulose sodium salt.

Silicates of soda are unusually desirable components of my solutions, or baths. The following table lists several of these.

| Substance: | $SiO_2/Na_2O$ molar ratio |
|---|---|
| Sodium orthosilicate | 0.50 |
| Sodium sesquisilicate | 1.00 |
| Sodium metasilicate | 1.00 |
| Water-glass | 3.00 to 4.00 |

The water-glass type of sodium silicate is also of interest in preparing silicate baths of high pH. They are available at low price in the form of concentrated solutions. It will be evident that such a solution may be used, in combination with caustic soda, to prepare, inexpensively, a solution of the more basic silicates.

The abrasive materials which are useful in the process are numerous and include such substances as silicon carbide, aluminas of the corundum type, finely divided metals, various diatomaceous earths and ordinary silica, or sand, preferably washed and screened to the desired size. The last-named material is so satisfactory and inexpensive that the invention will be described in connection with the use of sand, only.

The various materials listed in the preceding paragraphs are given by way of illustration, only. The invention is by no means limited to their use and includes other substances of similar properties.

The cleaning slurry is effective, to some extent, at temperatures as low as atmospheric. The efficiency increases rapidly with rising temperature, however, and optimum results are usually obtained in the range of 60° to 100° C.

Th pH of the solution may vary over a wide range and fair results are obtainable well on the acid side of neutrality. Some of the most effective cleaning solutions have pH values of 9, or higher, and very effective solutions based on silicates or caustic soda function in the pH range of 10 to 13.

The amount of sand in the slurry may vary over a considerable range. If less than 10% by weight is present, the slurry may be relatively inefficient. If more than 40% of sand, difficulties in pumping and spraying may be encountered. Satisfactory results are usually obtained with a sand content of 15 to 35%.

In carrying out the hereindescribed process, I prepare a cleaning solution, as above defined, and make it into a slurry with sand, or other abrasive, the slurry being of a consistency suitable for pumping. The slurry is constantly agitated to keep the sand from settling out. The slurry is then brought into contact with the metal surface to be cleaned, preferably by spraying. The more forcibly it is thrown against the metal surface, the faster and more efficient the cleaning.

The action of the water-soluble cleaning materials is greatly assisted by the scouring action of the sand particles and there results a complete and rapid removal of oil and other soil. In addition, any rust on the surface is usually removed by the mechanical action of the sand particles.

After rinsing, the metal surface is then ready to receive a bonding coat of the phosphate, oxalate or chromate type, or a vitreous enamel. The metal may also be plated by electrolytic or non-electrolytic processes with no further treatment, a pickling operation being usually unnecessary.

The following formulae are for the aqueous cleaning solution. In every case, enough water is supplied to make a total of 100 parts. All amounts given have been calculated to a 100% active, anhydrous basis.

|  | Parts |
|---|---|
| Formula 1: Sodium orthosilicate | 2.0 |
| Formula 2: | |
|   Sodium orthosilicate | 2.0 |
|   Dodecylbenzene sodium sulfonate | 0.2 |
| Formula 3: | |
|   Sodium orthosilicate | 2.0 |
|   Sodium hydroxide | 0.5 |
|   Dodecylbenzene sodium sulfonate | 0.2 |
| Formula 4: | |
|   Sodium metasilicate | 2.0 |
|   Sodium carboxymethyl cellulose | 0.1 |
|   Soap | 0.5 |
| Formula 5: | |
|   Waterglass ($Na_2Si_3O_7$) | 0.8 |
|   Sodium hydroxide | 1.4 |
|   Dodecylbenzene sodium sulfonate | 0.2 |
| Formula 6: Caustic soda | 0.5 |
| Formula 7: | |
|   Caustic soda | 0.4 |
|   Dodecylbenzene sodium sulfonate | 0.2 |
| Formula 8: | |
|   Trisodium phosphate | 3.0 |
|   Sodium hydroxide | 0.4 |
|   Dodecylbenzene sodium sulfonate | 0.2 |

Formula 9:
- Ammonium hydroxide _____ 3.0
- Non-ionic detergent above described _____ 0.3

Formula 10: Dodecylbenzene sodium sulfonate ____ 0.5

Formula 11:
- Sodium metasilicate _____ 2.0
- Sodium tripolyphosphate _____ 0.5
- Ethylenediamine tetraacetic acid sodium salt ____ 0.1

Formula 12:
- Sodium orthosilicate _____ 6.0
- Sodium hydroxide _____ 0.5
- Dodecylbenzene sodium sulfonate _____ 0.2

Formula 10 has a pH of 6. Formula 12 is for very heavy duty cleaning. The preceding formulae are by way of illustration, only, and may be varied widely to suit individual cases.

By far, the largest use of the present invention is in the cleaning of sheet steel. This material is usually oiled at the time of manufacture to prevent rusting, which this treatment falls far short of doing. When ready for cleaning by the fabricator, the sheet, or the object made from the sheet, carries dirt, oil, gummy materials from oil oxidation, often, drawing compounds and stamping inks and, usually, some rust.

Treatment of the metal by the present process quickly and completely removes all such materials, leaving a surface which is clean and free from water-breaks. Freedom from water-breaks is of the greatest importance if the metal is to be given a bonding coat or a metal plating.

Oiled sheet usually carries a little rust, sometimes visible only under magnification. Ordinary aqueous metal-cleaning solutions have little or no capacity for removing rust, thus necessitating a fairly expensive acid pickle for many purposes. The sand slurry herein described removes rust by its scouring action, thus saving a pickling step or an expensive hand-processing with buffing wheels or the equivalent.

In extreme cases, if all the rust is not removed at the first pass through the sand slurry treatment, the item can be recycled at trifling cost. The removal of all rust is highly important since even microscopic particles act as centers for the initiation and spread of oxidation.

The method of carrying out the process which has been described above is well adapted to large-scale operations, batch or continuous, particularly the latter. The same method can also be used for cleaning a continuous strip or sheet of metal.

A variant of the process which is well adapted to the cleaning of small metal objects including those of irregular or intricate shape, either by batch or continuous process, is as follows. The cleaning slurry as above described is placed, together with the metal objects to be cleaned, in a tumbling-barrel, or equivalent mechanism, and the cleaning slurry and the metal objects are repeatedly thrown together by rotation of the barrel, or other form of agitation. The abrasive and the cleaning solution perform their scouring and cleaning functions and very satisfactory results are quickly obtained.

It has been observed that metal cleaned by the present process has, for a short time after cleaning, a surface which is more active, chemically, than usual. Such surfaces appear to take plating, and also bonding coats, more readily than ordinary clean metal. This activation is believed to result from the mechanical working of the surface by the sand. The activation gradually disappears, particularly after drying and standing.

Among the advantages of the invention herein described are, (a) more rapid cleaning, (b) more thorough cleaning, (c) lower concentrations of cleaning chemicals to accomplish a given task and (d) removal of rust.

What I claim is:

1. Process for removing dirt, oil, rust and water-breaks from ferrous metal surfaces which comprises spraying the metal surface with a slurry composed of a finely divided abrasive material suspended in an aqueous solution containing dissolved cleaning agents comprising at least one of the class which consists of hydroxides and silicates of the alkali metals, non-ionic and anionic synthetic detergents, soap and sequestering agents, said slurry having a pressure at the spray-nozzle of at least 20 pounds per square inch and a temperature at the spray-nozzle of at least 35 degrees, centigrade.

2. Process for removing dirt, oil, rust and water-breaks from ferrous metal surfaces which comprises spraying the metal surface with a slurry composed of sand suspended in an aqueous solution containing dissolved cleaning agents, said slurry having a pressure at the spray-nozzle of at least 20 pounds per square inch and a temperature at the spray-nozzle of at least 35 degrees, centigrade.

References Cited in the file of this patent

UNITED STATES PATENTS

| | | |
|---|---|---|
| 2,185,262 | Lupo | Jan. 2, 1940 |
| 2,540,003 | McCoy | Jan. 30, 1951 |
| 2,605,596 | Uhri | Aug. 5, 1952 |
| 2,652,662 | Newell | Sept. 22, 1953 |